United States Patent

Shimizu et al.

[11] Patent Number: 6,163,093
[45] Date of Patent: Dec. 19, 2000

[54] PUMP ACTUATION MOTOR FOR AUTOMOTIVE ANTILOCK BRAKE SYSTEM

[75] Inventors: Atsushi Shimizu; Takuya Maruo; Naotoshi Tamai, all of Nagano, Japan

[73] Assignee: Nissin Kogyo Co., Ltd., Nagano, Japan

[21] Appl. No.: 09/503,734

[22] Filed: Feb. 15, 2000

[30] Foreign Application Priority Data

Mar. 24, 1999 [JP] Japan .................. 11-079416

[51] Int. Cl.[7] .................. H02K 15/02; H02K 5/00
[52] U.S. Cl. .................. 310/42; 310/89; 310/91
[58] Field of Search .................. 310/90, 91, 42, 310/89; 29/596–598; 303/116.1, 116.4, 113.3, 113.4

[56] References Cited

U.S. PATENT DOCUMENTS

| | | | |
|---|---|---|---|
| 4,797,762 | 1/1989 | Levy et al. | 360/99.06 |
| 5,555,211 | 9/1996 | Bernett | 360/99.08 |

FOREIGN PATENT DOCUMENTS 8-510314  10/1996  Japan .
9-323643  12/1997  Japan .

*Primary Examiner*—Tran Nguyen
*Attorney, Agent, or Firm*—McGuireWoods LLP

[57] ABSTRACT

A pump actuation motor includes a yoke (15), a rotation shaft (12) that has, on one end side, a supported shaft portion (12*d*) that is inserted into and supported by a block body (9) and an eccentric shaft portion (12*c*) that actuates the plunger pumps (5) and (6) and, on the other end side, a rotor and a commutator (22) attached therearound, a brush holder (23) that holds a brush (24) that can supply electric power from the block body (9) side to the commutator (22), and a housing (26) that is so mounted between the yoke (15) and the block body (9)side as to cover an opening of such yoke (15), wherein the rotation shaft (12) includes a recessed portion (12*a*) that opens on an end surface of the other end side while the yoke (15) includes a protruding portion 15*a* that protrudes into the recessed portion (12*a*) that is formed as a part of such yoke (15), and the other end side of the rotation shaft (12) is supported by such protruding portion (15*a*).

8 Claims, 5 Drawing Sheets

PUMP ACTUATION MOTOR FOR AUTOMOTIVE ANTILOCK BRAKE SYSTEM

BACKGROUND OF THE INVENTION

1. Field of the Invention

The present invention relates to a pump actuation motor for an automotive antilock brake system.

2. Description of the Related Art

Nowadays, many an automobile is equipped with an antilock braking system (hereinafter referred to as automotive ABS) for controlling braking torque to prevent wheels from locking at braking, which may cause a slip of wheels over the road surface or a loss of steering wheel operational performance.

The automotive ABS controls the braking torque so that wheel slip rate at the time of braking will be maintained within an appropriate range, whereby the automotive ABS is structured so as to output a maximum braking force at any time, even under a slippery circumstance where steering performance of the wheels is deteriorated, for instance, such as rain, snow or a gravel road.

To describe an example of the automotive ABS, brake fluid can circulate within a hydraulic pressure circuit formed between a brake master cylinder that is so provided as to connect with a brake pedal for an automobile and wheel cylinders that are so provided as to connect with wheel brakes. In addition, there is provided an actuator which controls the hydraulic pressure by opening and closing normally-open solenoid valves and normally-closed solenoid valves that are disposed on the hydraulic pressure circuit that extends from the brake master cylinders to the wheel cylinders. The actions of the actuator are controlled by an electronic control unit that uses a microcomputer. The electronic control unit receives output on the travelling state of an automobile from such as wheel speed sensors that are provided on the wheels respectively.

The electronic control unit controls the actuator with a command in any of these modes: a pressure increase mode where the braking torque.is increased by increasing the hydraulic pressure that is applied from the brake master cylinders to the wheel cylinders, a holding mode where the braking torque is held by preventing the hydraulic pressure transmission from the brake master cylinders to the wheel cylinders, and a pressure decrease mode where the braking torque is decreased by temporarily reserving the hydraulic pressure from the wheel cylinders at reservoirs (tanks) to prevent locking state at the wheels.

Among these modes, at a transition to the pressure decrease mode, it is required to return brake fluid reserved in the reservoirs to the side of the brake master cylinders, and return the reservoirs to the initial empty state. For this purpose, pumps are provided in the hydraulic pressure circuit that is connected to the reservoirs and the brake fluid is returned to the master cylinders through drive of such pumps by the motor.

In these years, reduction in the size and weight has been in demand for the automotive design and thus a similar design concept has been in demand for the automotive ABS. Especially, for a pump actuation motor that is disposed in the engine room in the automotive ABS, there has been a compactification demand.

As for the structure of the motor, an hydraulic pump driving apparatus has been proposed on JP-A-9-323643, for instance. In this hydraulic pump driving apparatus, bearing holders are so formed in a cup shape as to expand in an axial direction at center parts of end walls respectively on the side of a housing that stores the hydraulic pump and on the side of a motor casing (a yoke). A motor rotation shaft is supported by fitting a ball bearing into such bearing holders.

Alternatively, there is proposed an electric-powered pump motor assembly on JP-W-8-510314. In this electric-powered pump assembly, a barrel-shape bearing is so formed with a rivet at a bottom part of a motor housing (a yoke) as to support by fitting in a blind hole that is provided at one end of a rotation shaft of a motor.

In the oil hydraulic pump driving apparatus proposed in the above-described JP-A-9-323643, since the bearing holders are formed in the cup shape expanding in the axial direction respectively on the sides of the housing and the motor casing (yoke) that support the motor rotation shaft, compactification of the motor size in the axial direction is difficult. Additionally, as for the motor rotation shaft, since the eccentric shaft portion, which is formed in the vicinity of the shaft end on the housing side, is connected to an interlink mechanism that actuates the hydraulic pump, downsizing of the ball bearing on the side of the casing (the yoke) that supports the rotation shaft like a cantilever is limited for the reason of strength. Another problem is an increase in the quantity of parts with sealing material since a window is formed at the bearing holder on the casing (yoke) side.

In the electric-powered pump motor assembly shown in JP-W-8-510314, since the barrel-shape bearing is mounted on the motor housing (the yoke) as a separate part, the problems are not only that it was difficult to attain an accurate coaxiality of the housing (the yoke) and the bearing but also that it is necessary to seal the joint between the mounted part of the housing (the yoke) and the barrel-shape bearing and thus the quantity of the parts is increased.

Further, since the barrel-shape bearing is a slide bearing that needs oil replenishment, such as greasing, there is a fear that the oil exploded out of the bearing might stick to a power feeding part to thereby cause a power feed failure and abnormal wear and thus that the durability would be deteriorated.

Moreover, since some clearance (20 $\mu$m through 30 $\mu$m) between the motor rotation shaft and the barrel-shape bearing for mounting is required, still another problem of increase in the loudness of the working motor sound was caused by room around the rotation shaft.

SUMMARY OF THE INVENTION

The present invention is purposed to provide a pump actuation motor for an automotive antilock brake system, which can solve the above-described problems through downsizing by shortening the motor shaft length, improvement of coaxial accuracy of the yoke and the rotation shaft, increase in the assembling efficiency by decrease in the quantity of the parts and enhancement of the durability.

The invention comprises the following structure for achievement of the above-described purpose.

That is, an automotive-antilock-brake-system pump actuation motor for actuation of a pump disposed in a hydraulic pressure circuit of an automotive antilock brake system comprises a yoke, a rotation shaft that has, on one-end side, a supported shaft portion that is inserted into and supported by a system main body and an eccentric shaft portion that actuates the pump and, on the other end side, a rotor and a commutator are attached, a brush holder that holds a brush that can supply electric power from the system main body side to the commutator, and a housing that is so mounted between the yoke and the system main body side as to cover an opening of such yoke. The rotation shaft has a recessed portion that opens on an end surface of the other end side, the yoke has a protruding portion that protrudes into the recessed portion that is formed as a part of such yoke, and the other end side of the rotation shaft is supported by such protruding portion.

A slide bearing may be press-fitted between the protruding portion of the yoke and the recessed portion of the rotation shaft.

DETAILED DESCRIPTION OF THE PREFERRED EMBODIMENTS

Preferred embodiments related to the present invention are described in detail hereinafter with references to drawings.

Figure 8:
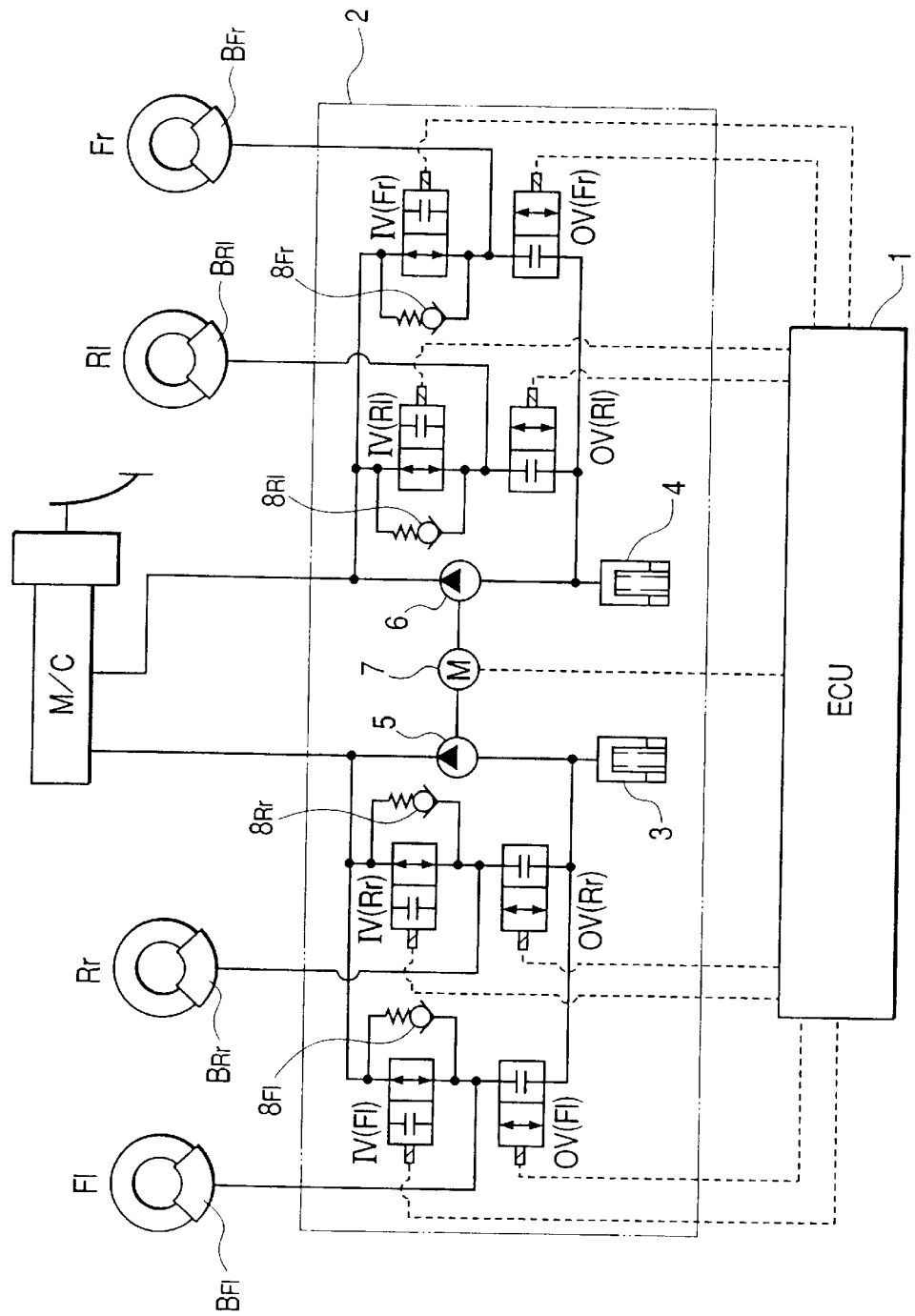
FIG. 8 is a view showing a typical configuration of the automotive antilock brake system.

With references to FIG. 8, a schematic configuration of the pump actuation motor for the automotive antilock brake system is described first. An electronic control unit 1 (ECU) controls the actions of the hydraulic pressure circuit that constitutes an actuator 2. Brake master cylinders M/C that produce brake fluid pressure from each of the cylinder chambers in accordance with the amount of depression on a brake pedal (not shown) is connected to the hydraulic pressure circuit inside the actuator 2. A left front wheel Fl, a right rear wheel Rr, a left rear wheel Rl and right front wheel Fr are respectively provided with wheel brakes $B_{Fl}$, $B_{Rr}$, $B_{Rl}$ and $B_{Fr}$. The hydraulic pressure circuit of the actuator 2 is connected to wheel cylinders (not shown) that actuate the wheel brakes.

The actuator 2 includes normally-open input valves IV (Fl) and IV (Rr) that connect to cylinders of the wheel brakes $B_{Fl}$ and $B_{Rr}$ and input valves IV (Rl) and IV (Fr) that connect to cylinders of the wheel brakes $B_{Rl}$ and $B_{Fr}$ respectively from the brake master cylinders M/C. To these four input valves, normally-closed output valves OV (Fl), OV (Rr), OV (Rl) and OV (Fr) are respectively connected in parallel.

The output valves OV (Fl) and OV (Rr) are connected to a reservoir 3 for temporary reserve of brake fluid and the output valves OV (Rl) and OV (Fr) are connected to a reservoir 4 for temporary reserve of brake fluid, respectively.

The reservoirs 3 and 4 are connected to the inlets of plunger pumps 5 and 6, and such plunger pumps 5 and 6 circulate the brake fluid to return from the reservoirs 3 and 4 to the brake master cylinders M/C. The pump actuation motor 7 actuates the plunger pumps 5 and 6 through reciprocation of the pistons when the motor is driven to revolve as described below.

The normally-open input valves IV (Fl), IV (Rr), IV (Rl) and IV (Fr) are opened and closed by solenoid valves that are driven with solenoids, and the opening and closing actions are controlled by the electronic control unit 1. The normally-closed output valves OV (Fl), OV (Rr), OV (Rl) and OV (Fr) are also opened and closed by solenoid valves that are driven with solenoids, and the opening and closing actions are controlled by the electronic control unit 1. Check valves $8_{Fl}$, $8_{Rr}$, $8_{Rl}$ and $8_{Fr}$ are respectively connected in parallel to the normally-open input valves IV (Fl), IV (Rr), IV (Rl) and IV (Fr), which are opened to return the brake fluid from the corresponding wheel brakes $B_{Fl}$, $B_{Rr}$, $B_{Rl}$ and $B_{Fr}$ to the brake master cylinders M/C after cancellation of input to such-brake master cylinders M/C.

The electronic control unit 1 receives output on the travelling state of an automobile from such as wheel speed sensors (not shown) that are provided on the wheels Fl, Rr, Rl and Fr, respectively. The electronic control unit 1 controls the actuator 2 with a command to each of the wheel brakes $B_{Fl}$, $B_{Rr}$, $B_{Rl}$ and $B_{Fr}$ respectively in response to the travelling state of the automobile in any of a pressure increase mode, a holding mode and a pressure decrease mode. In the pressure increase mode, the braking torque is increased by respectively opening the normally-open input valves IV (Fl), IV (Rr), IV (Rl) and IV (Fr) and by closing the normally-closed output valves OV (Fl), OV (Rr), OV (Rl) and OV (Fr) so as to increase the hydraulic pressure that is applied to the wheel cylinders (not shown) from the brake master cylinders M/C. In the holding mode, the braking torque is held by respectively closing the normally-open input valves IV (Fl), IV (Rr), IV (Rl) and IV (Fr) and the normally-closed output valves OV (Fl), OV (Rr), OV (Rl) and OV (Fr) so as to prevent the hydraulic pressure transmission from the brake master cylinders M/C to the wheel cylinders (not shown). In the pressure decrease mode, the braking torque is decreased by respectively closing the normally-open input valves IV (Fl), IV (Rr), IV (Rl) and IV (Fr) and opening the normally-closed output valves OV (Fl), OV (Rr), OV (Rl) and OV (Fr) so as to temporarily reserve the hydraulic pressure from the wheel cylinders (not shown) at reservoirs 3 and 4 and to prevent locking state at the wheels.

Among these modes, at a transition to the pressure decrease mode, the electronic control unit 1 drives the pump actuation motor 7 to actuate the plunger pumps 5 and 6, so that the brake fluid temporarily reserved in the reservoirs 3 and 4 is returned to the side of the brake master cylinders M/C.

Figure 4:
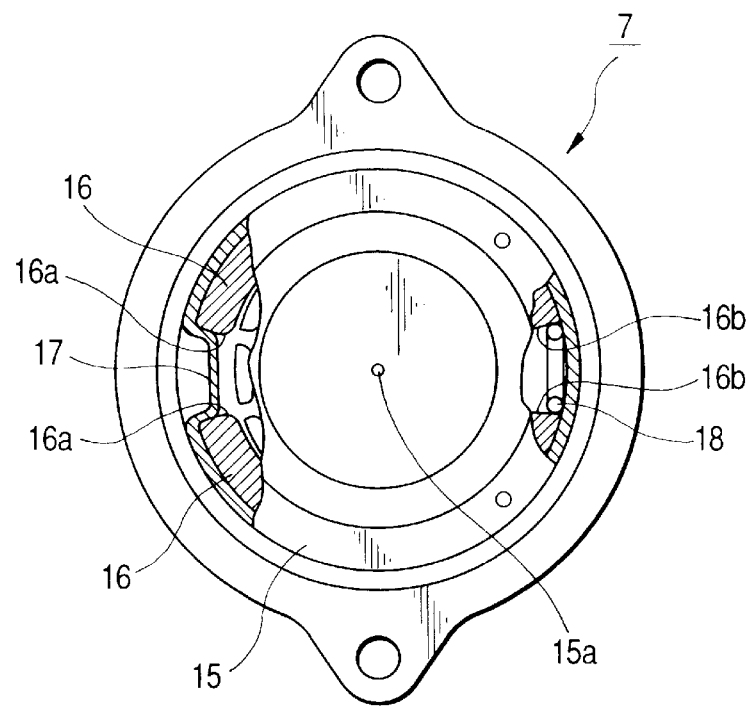
FIG. 4 is a left side view of the pump actuation motor in FIG. 1.
Figure 5:
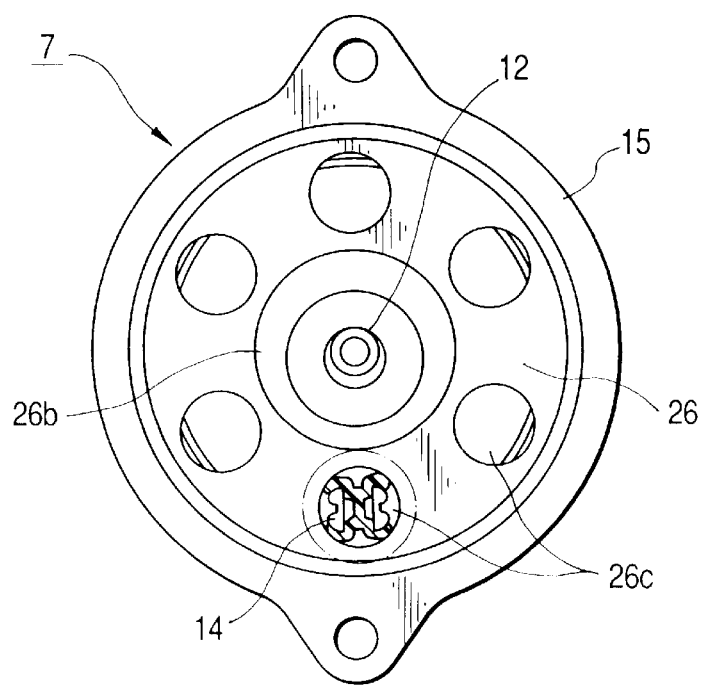
FIG. 5 is a right side view of the pump actuation motor in FIG. 1.
Figure 6:
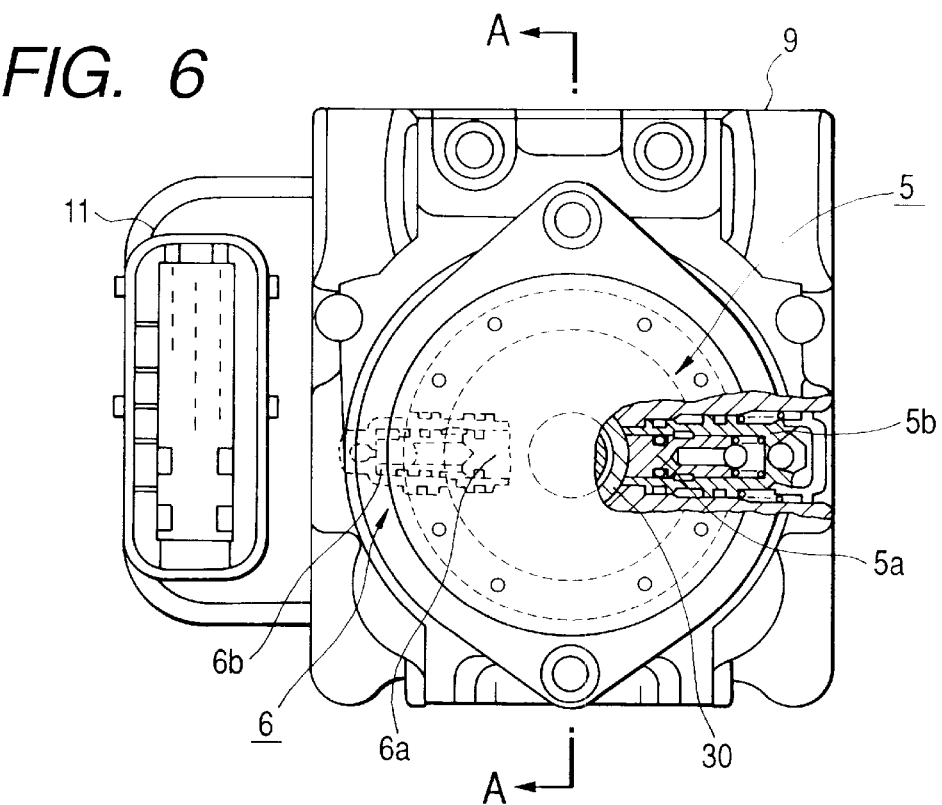
FIG. 6 is a partly-cutout explanation view of the actuator.
Figure 7:
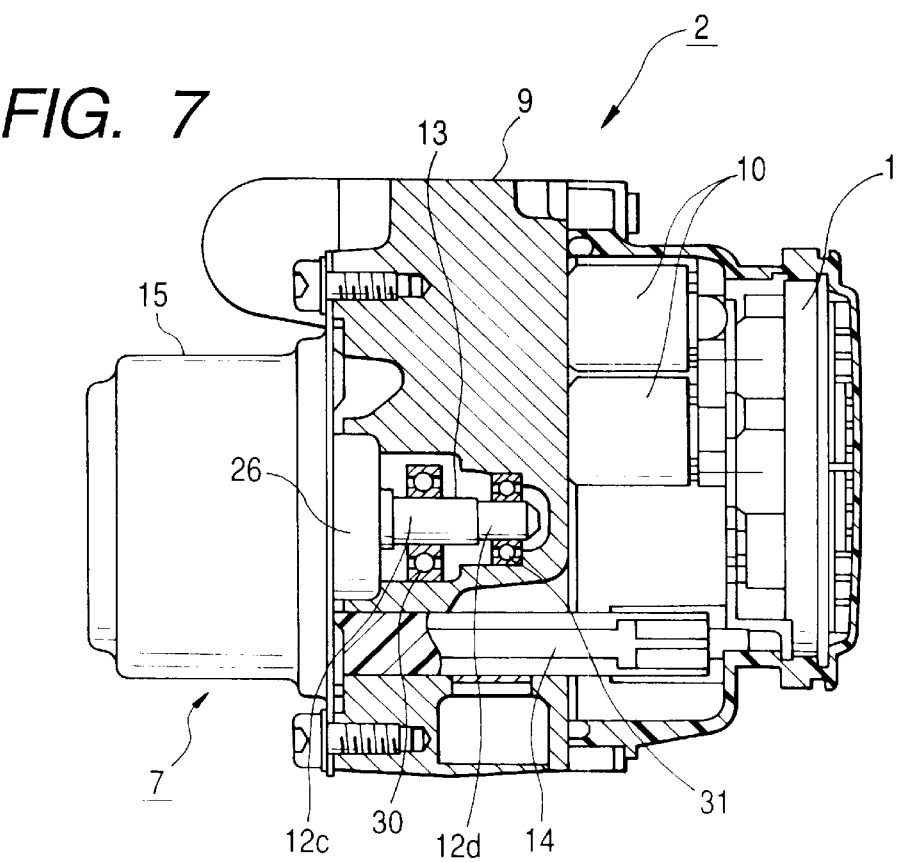
FIG. 7 is a partly-cutout explanation view of the actuator viewed in a direction showed with arrows A—A in FIG. 6.

Next, the structure of the pump actuation motor 7 is described with reference to FIGS. 1 through 7. Firstly, as to the external structure of the pump actuation motor 7, as shown in FIGS. 6 and 7, a block body 9 that constitutes a system main body on which the actuation motor 7 is mounted is a metal body formed in shape of a block. The block body 9 is provided with the plunger pumps 5 and 6 (see FIG. 6) that is actuated by the pump actuation motor 7. Further, in the block body 9, there is attached thereon parts, such as the solenoids 10 that open and close the normally-open input valves IV (Fl), IV (Rr), IV (Rl) and IV (Fr) and the normally-closed output valves OV (Fl), OV (Rr), OV (Rl) and OV (Fr), and the electronic control unit 1 for control of actions of the actuator 2 (see FIG. 7). A connector 11 for power supply to the electronic control unit 1 is provided on the block body 9 (see FIG. 7). The pump ctuation motor 7 is mounted and secured in such a manner that a main-body-side end portion 13 being one end of the rotation shaft 12 is inserted within the block body 9 and a terminal 14 for supplying power to the pump actuation motor 7 is inserted into a connection terminal in the electronic control unit 1 (see FIG. 7).

Figure 1:
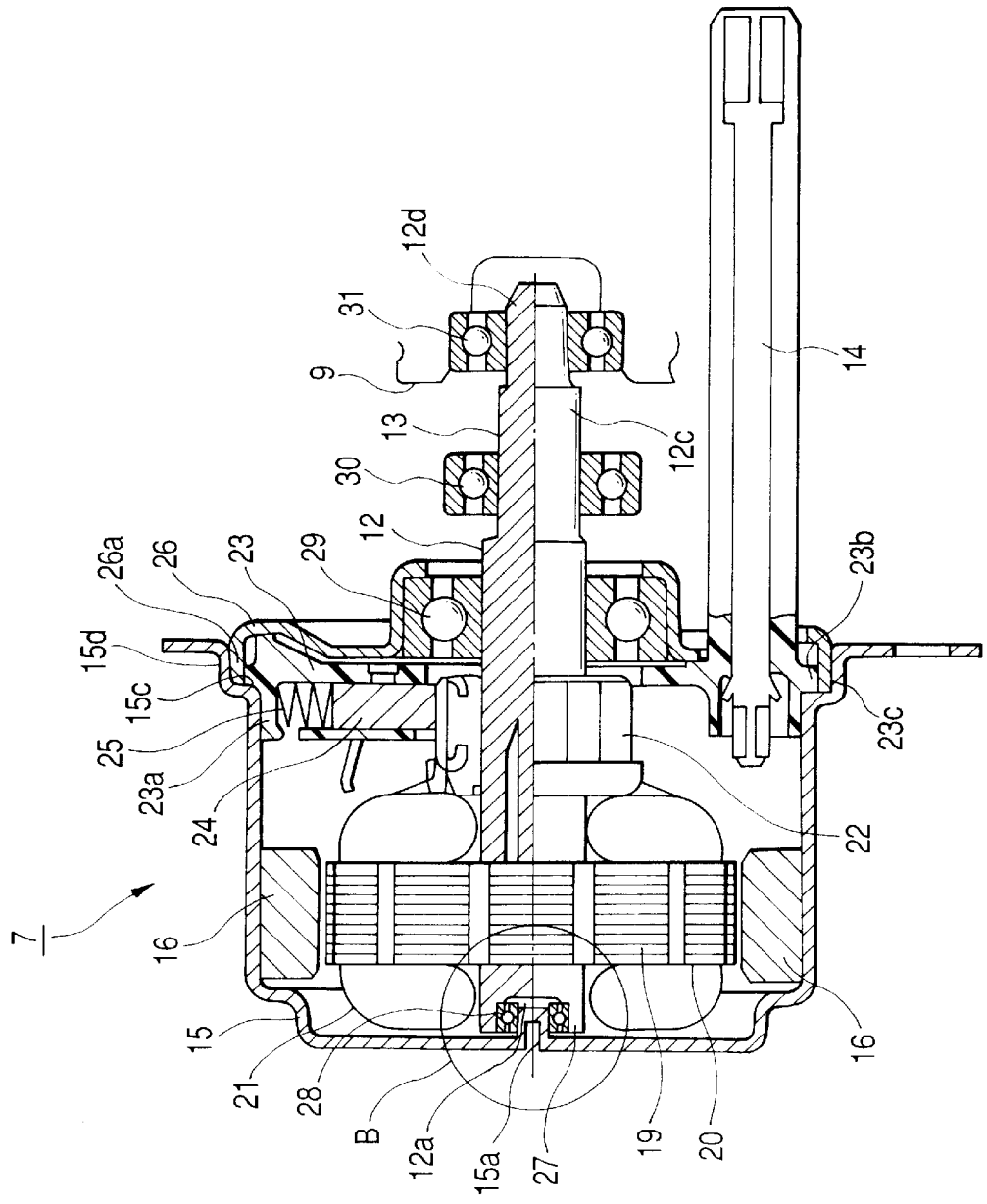
FIG. 1 is a cross-sectional view showing an entire configuration of a pump actuation motor for an automotive antilock brake system.

Next, the structure of the pump actuation motor 7 is described in more detail. The pump actuation motor 7 utilizes an inner-rotor-type motor. In FIG. 1, the structure of the stator of the motor is described first. A yoke 15 that is formed in a cup shape constitutes the exterior of the motor. The yoke 15 is preferably made of a metal material, such as a steel plate for deep drawing (SPCE).

A plurality of arc-shaped magnets 16 (two in this embodiment) of a magnetic material, such as ferrite, are attached on the inner wall surface of the yoke 15 and magnetized in a necessary number of magnetic poles (quadrupoles in this embodiment). As shown in FIG. 4, a projection 17 is formed on the inner wall surface of the yoke 15 along the axial direction in an inwardly expanded form. One end 16a of each the magnet 16 is abutted against either sides of the projection 17 while a U-shape clip 18 as an elastic member is elastically clamped between the other ends 16b of the magnets 16, so that the magnets 16 are securely mounted with mechanically intensified forces applied in the circumferential directions thereof. The magnets 16 are detachable when the clip 18 is removed and thus can be recycled.

The structure of a rotor of the motor is described now. In FIG. 1, a core 19 is fitted in the rotation shaft 12. An insulating material 20 coats around the core 19, and an armature winding (magnet wire) 21 is wound around the slot formed in the core 19.

A commutator 22 is fitted on an end portion 27 on the rotor side being the other end of the rotation shaft 12 and energizes the armature winding 21 as to apply force on the rotor in the revolving direction. A brush holder 23 holds a brush 24 that can supply electric power to the commutator 22 on the rotor side from the block body 9 that is the system main body side. The brush 24 is so. applied with a force as to normally slidably contact with the commutator 22. That is, a spring 25 is mounted elastically between an inner surface of a raised fitting wall 23a of the brush holder 23 and the brush 24.

To assemble the brush holder 23, the raised fitting wall 23a is fitted in an opening of the yoke 15 and, while the flange part 23b is thrust against a stepped portion 15c of the yoke 15, an outer flange wall 23c is thrust against an inner wall surface of a fitting part 26a of a housing 26 that is so fitted as to cover the opening of the yoke 15.

The housing 26 is interposed between the yoke 15 and the block body 9 in such a manner that the fitting part 26a is so fitted on a raised stepped portion wall 15d as to cover the opening of the yoke 15. As shown in FIG. 5, a shaft hole 26b for insertion of the rotation shaft 12 and a plurality of holes 26c for weight reduction are formed in the housing 26. One of the holes 26c is utilized as a hole for insertion of the terminal 14 for ensuring electric continuity to the electronic control unit 1 on the block body 9 side.

As shown in FIG. 1, in the rotation shaft 12, there is formed a recessed portion 12a that opens at the other end thereof being the end surface of the rotor-side end portion 27. At the axial center part of the yoke 15, there is provided a protruding portion 15a that protrudes toward the inside of the recessed portion 12a and is formed as a part of the single piece of the yoke 15 by press working. The protruding portion 15a can support the rotor-side end portion 27 of the rotation shaft 12. The protruding portion 15a of the yoke 15 and the projection 17 formed on the inner wall surface of the yoke 15 is formed as a part of the single piece by a press working (squeezing process). A shaft-end ball bearing 28 is press-fitted as a rolling bearing between the protruding portion 15a of the yoke 15 and the recessed portion 12a of the rotation shaft 12.

In this way, as for the rotation shaft 12, the rotorside end portion 27 can be supported to the protruding portion 15a that is formed as a part of the single piece of the yoke 15 and protrudes toward the inside of the recessed portion 12a that opens at the shaft end surface of the rotor-side end portion 27. Thus, the length of the rotation shaft 12 in the axial direction is reduced to thereby perform the compactification of the whole motor in the axial direction. Since the yoke 15 and the protruding portion 15a are formed in a single piece, the sealing material in the case of composition as the independent parts is not necessary. Moreover, since the protruding portion 15a can be formed to be coaxial with the rotation shaft 12 at the press working, the coaxial accuracy to the rotation shaft 12 can be improved.

The press-fitting of the shaft-end ball bearing 28 between the protruding portion 15a of the yoke 15 and the recessed portion 12a of the rotation shaft 12 eliminates the oil replenishment, such as greasing, and accordingly eliminates the cause for power feed failure and abnormal wear by the oil exploded out of the bearing, and thus the durability of the motor can be enhanced.

Additionally, since the rotor-side end portion 27 is. supported by the shaft-end ball bearing 28, there is no need for clearance between the rotation shaft 12 and the shaft-end ball bearing 28, and thus the loudness of the working motor sound can be reduced.

Figure 2:
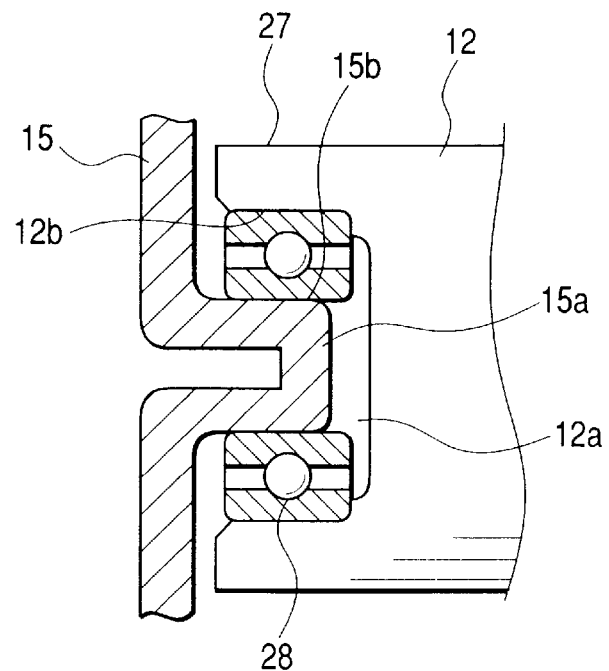
FIG. 2 is an enlarged explanation view showing the support structure of the rotation shaft on the yoke side of part B in FIG. 1.
Figure 3:
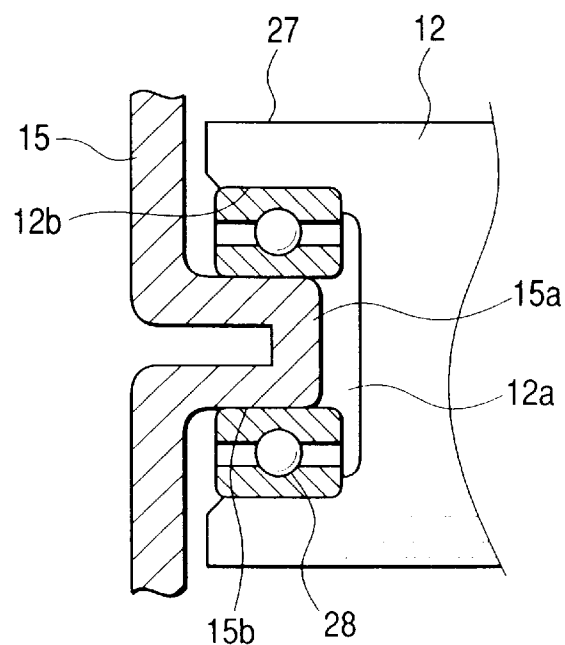
FIG. 3 is an enlarged explanation view shownwing the support structure of the rotation shaft on the yoke side of part B in FIG. 1.

The shaft-end ball bearing 28 may be press-fitted into a recessed portion inner wall surface 12b of the rotation shaft 12 and so assembled as to form a little clearance between the bearing 28 and a protruding portion outer wall surface 15b of the protruding portion 15a as shown in FIG. 2. Further, the shaft-end ball bearing 28 may be press-fitted onto the protruding portion outer wall surface 15b of the protruding portion 15a and so assembled as to form a little clearance between the bearing and the recessed portion inner wall surface 12b of the rotation shaft 12 as shown in FIG. 3.

But, to be more preferably, it is desirable that the shaft-end ball bearing 28 is press-fitted into the recessed portion inner wall surface 12b of the rotation shaft 12 as shown in FIG. 2. The reason is that, if the bearing 28 is press-fitted onto the protruding portion 15a that is formed by press working, a tolerance in radial directions increases whereas the bearing is of a small size and thus a design standard for the load in the radial directions becomes severer.

As shown in FIG. 1, a supporting ball bearing 29 is press-fitted on the rotation shaft 12. The supporting ball bearing 29 is so press-fitted as to be accommodated between the brush holder 23 and the housing 26. The supporting ball bearing 29 receives radial-direction load that is applied on the rotation shaft 12 since the housing 26 that covers the outer circumference of the ball bearing 29 is press-fitted into and supported to the block body 9.

An eccentric shaft portion 12c is formed in the vicinity of the main-body-side end portion 13 of the rotation shaft 12. An actuation ball bearing 30 is press-fitted on the eccentric shaft portion 12c. The actuation ball bearing 30 reciprocates pistons 5a and 6a of the plunger pumps 5 and 6 in cooperation with springs 5*b* and 6*b* (see FIG. 6). A supporting shaft portion 12*d* is formed on the main-body-side end portion 13 of the. rotation shaft 12. The supporting shaft portion 12*d* is press-fitted into and supported to the main-body-side ball-bearing 31 that is provided on the block body 9 side.

Configuration of the parts of the pump actuation motor 7 is now described as well as the support structure for the rotation shaft 12. As shown in FIG. 1, the main-body-side end portion 13 of the rotation shaft 12 is press-fitted onto and supported to the block body 9 in such a manner that the supporting shaft portion 12*d* is press-fitted in and supported to the main-body-side ball bearing 31, and the supporting ball bearing 29 that is press-fitted on the rotation shaft 12 is supported to the block body 9 via the housing 26. The eccentric shaft portion 12*c* that actuates the plunger pumps 5 and 6 is formed at the main-body-side end portion 13, and the actuation ball bearing 30 is press-fitted on the eccentric shaft portion 12*c*. At the rotor-side end portion 27 of the rotation shaft 12, the commutator 22 and rotor are stored and attached inside the yoke 15. The rotor-side end portion 27 of the rotation shaft 12 is supported to the shaft-end ball bearing 28 that is press-fitted between the recessed portion 12*a* that opens at the shaft end face and the protruding portion 15*a* of the yoke 15.

In this way, the main-body-side end portion 13 of the rotation shaft 12 is supported to the supporting ball bearing 29 and the main-body-side ball bearing 31 respectively in the vicinity of both sides of the actuation ball bearing 30 where large loads are applied in the radial directions while approximately no loads in the radial directions are applied at the rotor-side end portion 27. Thus, it is possible to use a small ball bearing as the end portion-supporting ball bearing 28.

To assemble the pump actuation motor 7 that has been assembled in the way described above onto the block body 9, the main-body-side end portion 13 of the rotation shaft 12, which extends from the housing 26 of the pump actuation motor 7 is press-fitted into the main-body-side bearing 31 in the block body 9 and then the outer circumference of the housing 26 is sealed.

It is clearly understood that a plenty of modifications are possible within the range wherein the spirit of the present invention is not deviated from; for example, although the embodiment described above utilizes the inner-rotor-type motor as the pump actuation motor 7, an outer-rotor-type motor is also applicable.

According to the invention, as for the rotation shaft, since it is possible that the rotor-side end portion is supported within the recessed portion that opens at the shaft end surface of the rotor-side end portion so that the protruding portion that is formed as one part of the single piece of the yoke protrudes toward inside of the recessed portion, the length of the rotation shaft in the axial direction is reduced to thereby perform the compactification of the whole motor in the axial direction. Since the yoke and the protruding portion are formed in a single piece, the sealing material in the case of composition as the independent parts is not necessary. Moreover, since the protruding portion can be formed to be coaxial with the rotation shaft at the press working, the coaxial accuracy to the rotation shaft can be improved.

Further, the press-fitting of the shaft-end ball bearing between the protruding portion of the yoke and the recessed portion of the rotation shaft eliminates the oil replenishment, such as greasing, and thus, eliminates the cause for power feed failure and abnormal wear by the oil exploded out of the bearing and the durability can be enhanced. Additionally, since the rotor-side end portion of the rotation shaft is supported by the rolling bearing that is press-fitted between the protruding portion of the yoke and the recessed portion of the rotation shaft, there is no need for clearance between the rotation shaft and the rolling bearing, and thus the loudness of the working motor sound can be reduced.

What is claimed is:

1. A pump actuation motor of an automotive antilock brake system for actuating a pump disposed in a hydraulic pressure circuit of the antilock brake system, said motor comprising:

a yoke;

a rotation shaft having a supported shaft portion that is inserted into and supported to a system main body and an eccentric shaft portion that actuates said pump at one end side thereof, and attached with a rotor and a commutator at the other end side thereof;

a brush holder holding a brush for supplying electric power to said commutator from a side of said system main body; and a housing interposed between said yoke and said system main body side to cover an opening of said yoke;

wherein said rotation shaft comprises a recessed portion formed on an end surface of the other end side, and said yoke is integrally formed with a protruding portion protruding into said recessed portion so that the other end side of said rotation shaft is supported by said protruding portion.

2. A pump actuation motor for an automotive antilock brake system according to claim 1, further comprising:

a rolling bearing press-fitted between said protruding portion of said yoke and said recessed portion of said rotation shaft.

3. A pump actuation motor of an automotive antilock brake system for actuating a pump disposed in a hydraulic pressure circuit of the antilock brake system, said motor comprising:

a yoke attached to a system main body;

a housing interposed between said yoke and said system main body to cover an opening of said yoke; and a rotation shaft partially received within said yoke and extending toward said system main body while penetrating said housing, said rotation shaft being partitioned by said housing into one end side supported to said system main body and the other end side supported to said yoke, wherein said rotation shaft is formed with a recessed portion on an end surface of the other end side, and said yoke is integrally formed with a protruding portion coaxially protruding into said recessed portion, so that the other end side of said rotation shaft is supported to said yoke.

4. A pump actuation motor of an automotive antilock brake system according to claim 3, wherein said rotation shaft includes a supported shaft portion rotatably supported to said system main body, and an eccentric shaft portion for actuating said pump, at said one end side thereof, and further said rotation shaft is attached with a rotor and a commutator, at the other end side thereof.

5. A pump actuation motor of an automotive antilock rake system according to claim 4, further comprising:

a brush supplying electric power to said commutator from a side of said system main body; and a brush holder holding said brush while urging said brush toward said commutator.

6. A pump actuation motor for an automotive antilock brake system according to claim 4, further comprising:

a first rolling bearing press-fitted into at least one of said protruding portion of said yoke and said recessed portion of said rotation shaft;

a second rolling bearing disposed around said supported shaft portion of said rotation shaft; and a third rolling bearing disposed around said rotation shaft and press-fitted into said housing.

7. A pump actuation motor for an automotive antilock brake system according to claim 3, further comprising:

a rolling bearing press-fitted into at least one of said protruding portion of said yoke and said recessed portion of said rotation shaft.

8. A pump actuation motor for an automotive antilock brake system according to claim 3, wherein said protruding portion is formed by the press working.

* * * * *